US012219673B2

(12) United States Patent
Mironov et al.

(10) Patent No.: US 12,219,673 B2
(45) Date of Patent: Feb. 4, 2025

(54) FLUID PERMEABLE HEATER ASSEMBLY FOR AEROSOL-GENERATING SYSTEMS AND FLAT ELECTRICALLY CONDUCTIVE FILAMENT ARRANGEMENT FOR FLUID PERMEABLE HEATER ASSEMBLIES

(71) Applicant: Altria Client Services LLC, Richmond, VA (US)

(72) Inventors: Oleg Mironov, Cudrefin (CH); Ihar Nikolaevich Zinovik, Peseux (CH)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 18/326,460

(22) Filed: May 31, 2023

(65) Prior Publication Data

US 2023/0309198 A1 Sep. 28, 2023

Related U.S. Application Data

(63) Continuation of application No. 16/851,761, filed on Apr. 17, 2020, now Pat. No. 11,737,175, which is a (Continued)

(30) Foreign Application Priority Data

May 31, 2016 (EP) .................................... 16172195

(51) Int. Cl.

*H05B 3/34* (2006.01)
*A24F 40/10* (2020.01)

(Continued)

(52) U.S. Cl.

CPC ............... *H05B 3/34* (2013.01); *A24F 40/40* (2020.01); *A24F 40/44* (2020.01); *A24F 40/46* (2020.01);

(Continued)

(58) Field of Classification Search

CPC .......... A24F 40/10; A24F 40/40; A24F 40/44; A24F 40/46; H05B 2203/021;

(Continued)

(56) References Cited

U.S. PATENT DOCUMENTS

2006/0201933 A1* 9/2006 Carpino, II .............. H05B 3/34 219/545
2011/0155153 A1 6/2011 Thorens et al.

(Continued)

FOREIGN PATENT DOCUMENTS

CN 201072810 Y 6/2008
CN 102425023 B 5/2014

(Continued)

OTHER PUBLICATIONS

Office Action dated May 17, 2023 issued in related Philippines Patent Application No. 1-2018-501937.

(Continued)

*Primary Examiner* — Joe E Mills, Jr.

(74) *Attorney, Agent, or Firm* — Harness, Dickey & Pierce, P.L.C.

(57) ABSTRACT

An electrically conductive flat filament arrangement for a fluid permeable heater assembly for aerosol-generating systems includes a center portion and two side portions. The two side portions are on opposite sides of the center portion. The center portion defines a heating region of the filament arrangement and the side portions define electrical contact regions of the filament arrangement. The center portion and the two side portions each include a plurality of openings. Each plurality of openings defines an open area of the center portion and an open area of each of the two side portions. A percentage of the total area of the center portion including the open area of the center portion is greater than the (Continued)

percentage of the total area of one of the side portions including the open area of the side portion.

12 Claims, 3 Drawing Sheets

Related U.S. Application Data continuation of application No. 15/609,223, filed on May 31, 2017, now Pat. No. 10,667,557, which is a continuation of application No. PCT/EP2017/062251, filed on May 22, 2017.

(51) Int. Cl.
*A24F 40/40* (2020.01)
*A24F 40/44* (2020.01)
*A24F 40/46* (2020.01)
*H05B 3/26* (2006.01)
*H05B 3/44* (2006.01)

(52) U.S. Cl.
CPC ................. *H05B 3/26* (2013.01); *H05B 3/44* (2013.01); *A24F 40/10* (2020.01); *H05B 2203/021* (2013.01); *H05B 2203/022* (2013.01)

(58) Field of Classification Search
CPC ...... H05B 2203/022; H05B 3/26; H05B 3/34; H05B 3/44
See application file for complete search history.

(56) References Cited

U.S. PATENT DOCUMENTS

| | | | |
|---|---|---|---|
| 2011/0253798 | A1 | 10/2011 | Tucker et al. |
| 2013/0168382 | A1 | 7/2013 | Teramoto et al. |
| 2013/0213419 | A1 | 8/2013 | Tucker et al. |
| 2017/0042242 | A1 | 2/2017 | Hon |

FOREIGN PATENT DOCUMENTS

| | | | |
|---|---|---|---|
| CN | 102443954 | B | 7/2014 |
| CN | 104768407 | A | 7/2015 |
| DE | 20111067 | U1 | 9/2001 |
| JP | H11-512224 | A | 10/1999 |
| JP | 2006-225182 | A | 8/2006 |
| JP | 2012-169109 | A | 9/2012 |
| WO | WO-2015/117702 | A1 | 8/2015 |
| WO | WO-2015/117704 | A1 | 8/2015 |
| WO | WO-2015117701 | A1 | 8/2015 |
| WO | WO-2017/207320 | A1 | 12/2017 |

OTHER PUBLICATIONS

Extended European Search Report for European Application No. 16172195.6 Dated Sep. 19, 2016.
International Search Report and Written Opinion for International Application No. PCT/EP2017/062251 dated May 2, 2018.
Kazakhstan Notice of Allowance for corresponding Application No. 2018/0932.1, dated Dec. 30, 2019, English translation thereof.
Russian Decision to Grant and Search Report for corresponding Application No. 2018143582, dated Jun. 25, 2020.
International Search Report and Written Opinion thereof dated Oct. 13, 2017 for corresponding International Application No. PCT/EP2017/062251.
International Preliminary Report on Patentability dated May 2, 2018 for corresponding International Application No. PCT/EP2017/062251.
Chinese Office Action dated Dec. 3, 2020 for corresponding Chinese Application No. 201780029449.2, and English-language translation thereof.
Taiwanese Office Action and Search Report dated Dec. 1, 2020 for corresponding Taiwanese Application No. 106117198, and English-language translation thereof.
Indian Examination Report dated Dec. 24, 2020 for corresponding Indian Application No. 201817038337, with English-language translation.
Japanese Office Action dated May 10, 2021 for corresponding Japanese Application No. 2018-562085, and English-language translation thereof.
Ukrainian Office Action dated May 25, 2021 for corresponding Ukrainian Application No. a201810803, and English-language translation thereof.
Australian Examination Report dated Dec. 6, 2021 for corresponding Australian Application No. 2017273689.
Australian Notice of Allowance dated Jan. 6, 2022 for corresponding Australian Application No. 2017273689.
Office Action dated Sep. 27, 2021 issued in corresponding Brazilian patent application No. 1120180726672.
Office Action dated May 24, 2022 issued in corresponding Malaysian patent application No. PI 2018703372.
Japanese Office Action dated Aug. 15, 2022 for corresponding Japanese Application No. 2018-562085, and English-language translation thereof.
English-language translation of Malaysian Notice of Allowance and Search Report dated Oct. 3, 2022 for corresponding Malaysian Application No. MY-193297-A.
Notice of Allowance dated Dec. 21, 2022 issued in related Korean patent application No. 10-2018-7032736.
Notice of Allowance dated Juuly 16, 2024 issued in Philippines patent application No. 1-2018-501937.

* cited by examiner

FLUID PERMEABLE HEATER ASSEMBLY FOR AEROSOL-GENERATING SYSTEMS AND FLAT ELECTRICALLY CONDUCTIVE FILAMENT ARRANGEMENT FOR FLUID PERMEABLE HEATER ASSEMBLIES

CROSS-REFERENCE TO RELATED APPLICATIONS

This application is a continuation of U.S. application Ser. No. 16/851,761, filed Apr. 17, 2020, which is a continuation of U.S. application Ser. No. 15/609,223, filed May 31, 2017, which is a continuation of, and claims priority to, International Application No. PCT/EP2017/062251, filed on May 22, 2017, and further claims priority under 35 U.S.C. § 119 to European Patent Application No. 16172195.6, filed May 31, 2016, the entire contents of each of which are incorporated herein by reference.

BACKGROUND

Field

At least one example embodiment relates to fluid permeable heater assemblies for aerosol-generating systems and electrically conductive flat filament arrangements for such fluid permeable heater assemblies.

SUMMARY

At least one example embodiment relates to an electrically conductive flat filament arrangement for a fluid permeable heater assembly for aerosol-generating systems.

In at least one example embodiment, a flat filament arrangement comprises a center portion; and two side portions. The two side portions are arranged on opposite sides of the center portion. The center portion defines a heating region of the filament arrangement and the side portions defines electrical contact regions of the filament arrangement. The center portion and the two side portions each include a plurality of openings. The plurality of openings of the center area define an open area of the center portion and the plurality of openings of each side portion define an open area of each of the side portions. A percentage of the total area of the center portion including the open area of the center portion is greater than a percentage of the total area of one of the side portions including the open area of the side portion.

BRIEF DESCRIPTION OF THE DRAWINGS

Example embodiments are further described and illustrated by means of the following drawings.

DETAILED DESCRIPTION

Figure 1:
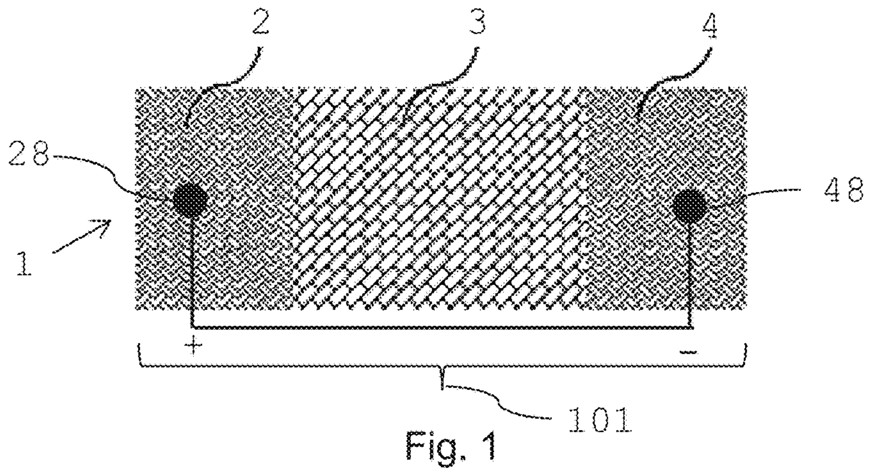
FIG. 1 is a schematic illustration of a mesh arrangement according to at least one example embodiment.

Example embodiments will become more readily understood by reference to the following detailed description of the accompanying drawings. Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings set forth herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein, but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of this disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the following description, illustrative embodiments may be described with reference to acts and symbolic representations of operations (e.g., in the form of flow charts, flow diagrams, data flow diagrams, structure diagrams, block diagrams, etc.) that may be implemented as program modules or functional processes including routines, programs, objects, components, data structures, etc., that perform particular tasks or implement particular abstract data types. The operations be implemented using existing hardware in existing electronic systems, such as one or more microprocessors, Central Processing Units (CPUs), digital signal processors (DSPs), application-specific-integrated-circuits (ASICs), SoCs, field programmable gate arrays (FPGAs), computers, or the like.

Further, one or more example embodiments may be (or include) hardware, firmware, hardware executing software, or any combination thereof. Such hardware may include one or more microprocessors, CPUs, SoCs, DSPs, ASICs, FPGAs, computers, or the like, configured as special purpose machines to perform the functions described herein as well as any other well-known functions of these elements. In at least some cases, CPUs, SoCs, DSPs, ASICs and FPGAs may generally be referred to as processing circuits, processors and/or microprocessors.

Although processes may be described with regard to sequential operations, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

According to at least one example embodiment, there is provided an electrically conductive flat filament arrangement for a fluid permeable heater assembly for aerosol-generating systems, for a heater assembly according to at least one example embodiment and as defined herein. The flat filament arrangement comprises a center portion and two side portions, wherein the two side portions are arranged on opposite sides of the center portion. The center portion defines a heating region of the filament arrangement and the side portions define electrical contact regions of the filament arrangement. The center portion and the two side portions each comprise a plurality of openings, each plurality of openings defining an open area of the center portion and an open area of each of the two side portions. The percentage of the total area of the center portion comprising the open area of the center portion is greater than the percentage of the total area of one of the side portions comprising the open area of the side portion.

The percentage of the total area of the center portion comprising the open area of the center portion may be greater than the percentage of the total area of each of the side portions comprising the open area of the side portion. The percentage of the total area of the center portion comprising the open area of the center portion may be greater than the percentage of the total area of both of the side portions comprising the open area of the side portions.

A ratio of the percentage of the total area of the center portion comprising the open area of the center portion to the percentage of the total area of one of the two side portions comprising the open area of the side portion may be between 1.1 and 30. The ratio of the percentage of the total area of the center portion comprising the open area of the center portion to the percentage of the total area of one of the two side portions comprising the open area of the side portion may be between 2 and 28, for example between 2 and 15 or between 15 and 28.

At least one example embodiment relates to an electrically conductive flat filament arrangement for a fluid permeable heater assembly for aerosol-generating systems, such as for a heater assembly as described and defined herein. The flat filament arrangement comprises a center portion and two side portions. The two side portions are arranged on opposite sides of the center portion. The center portion defines a heating region of the filament arrangement and the side portions define electrical contact regions of the filament arrangement. The center portion and the two side portions each comprise a plurality of openings. Each plurality of openings defines an open area of the center portion and an open area of each of the two side portions. A ratio of the open area in the center portion to the open area of one of the two side portions is between 1.1 and 30. In at least one example embodiment, the ratio of the open area of the center portion to the open area of one of the two side portions range from about 2 to about 28, from about 2 to about 15, or from about 15 to about 28.

The open area in the center portion may range from about 40 percent to about 90 percent of the total area of the center portion. In at least one example embodiment, the open area in the center portion ranges from about 50 percent to about 80 percent, or from about 50 to about 70 percent.

The open area in each of the two side portions is larger than zero and may be larger than about 3 percent and smaller than about 40 percent of each of the total areas of the two side portions. In at least one example embodiment, the open area in each of the side portions are larger than about 5 percent and smaller than about 35 percent, or smaller than about 20 percent. In at least one example embodiment, the open area in each of the two side portions ranges from about 5 percent to about 15 percent.

A center portion of the filament arrangement is defined to extend over or comprise about 20 percent of the size of the filament arrangement, but may extend to up to about 60 percent of the size of the filament arrangement. A side portion is defined to extend over or comprise about 20 percent of the size of the filament arrangement, but may extend to up to about 40 percent of the size of the filament arrangement. Thus, a center portion corresponding to a heating region of the filament arrangement having a large open area, for example of about 65 percent to about 85 percent, may be reduced to about 20 percent of the size of the filament arrangement. The remaining size of the filament arrangement may be side portions having little open area, for example from about 5 percent to about 10 percent, and where no or little heating occurs. The remaining size of the filament arrangement may also be side portions and transitions portions arranged between side portions and center portion as will be described in more detail below.

At least one example embodiment relates to a fluid permeable heater assembly for aerosol-generating systems. The fluid permeable heater assembly comprises an electrically conductive flat filament arrangement, and a first contact point and a second contact point for electrically contacting the flat filament arrangement. A longitudinal axis is defined between the first contact point and the second contact point. In the heater assembly, a center surface Sc is an area of the heater assembly extending between two lines lying perpendicular to the longitudinal axis and crossing the longitudinal axis at two points arranged on the longitudinal axis, one of the two points being situated at a distance from the first contact point equal to about 40 percent and the other one of the two points being situated at a distance from the first contact point equal to about 60 percent of the distance between the first and the second contact point. A first side surface 51 is an area of the heater assembly extending between two lines lying substantially perpendicular to the longitudinal axis and crossing the longitudinal axis at the first contact point and a point arranged on the longitudinal axis and situated at a distance from the first contact point equal to about 20 percent of the distance between the first and the second contact point. A second side surface S2 is an area of the heater assembly between two lines lying substantially perpendicular to the longitudinal axis and crossing the longitudinal axis at the second contact point and a point arranged on the longitudinal axis and situated at a distance from the first contact point equal to about 80 percent of the distance between the first and the second contact point.

The center surface Sc comprises a plurality of openings defining an open area ScOA, the first side surface S1 comprises a plurality of openings defining an open area S1OA, and the second side surface S2 comprises a plurality of openings defining an open area S2OA.

The percentage of the total area of the center surface comprising the open area of the center surface is greater than the percentage of the total area of the first side surface comprising the open area of the first side surface and the percentage of the total area of the center surface comprising the open area of the center surface is greater than the percentage of the total area of the second side surface comprising the open area of the second side.

A ratio of the percentage of the total area of the center surface comprising the open area of the center surface to the percentage of the total area of the center surface comprising the open area of the first side surface ScOA/S1OA may be from about 1.1 to about 30. A ratio of the percentage of the total area of the center surface comprising the open area of the center surface to the percentage of the total area of the second side surface comprising the open area of the second side surface ScOA/S2OA may range from about 1.1 to about 30.

At least one example embodiment relates to a fluid permeable heater assembly for aerosol-generating systems. The fluid permeable heater assembly comprises an electrically conductive flat filament arrangement, and a first contact point and a second contact point for electrically contacting the flat filament arrangement. A longitudinal axis is defined between the first contact point and the second contact point. In the heater assembly, a center surface Sc is an area of the heater assembly extending between two lines lying perpendicular to the longitudinal axis and crossing the longitudinal axis at two points arranged on the longitudinal axis, one of the two points being situated at a distance from the first contact point equal to about 40 percent and the other one of the two points being situated at a distance from the first contact point equal to about 60 percent of the distance between the first and the second contact point. A first side surface S1 is an area of the heater assembly extending between two lines lying substantially perpendicular to the longitudinal axis and crossing the longitudinal axis at the first contact point and a point arranged on the longitudinal axis and situated at a distance from the first contact point equal to about 20 percent of the distance between the first and the second contact point. A second side surface S2 is an area of the heater assembly between two lines lying substantially perpendicular to the longitudinal axis and crossing the longitudinal axis at the second contact point and a point arranged on the longitudinal axis and situated at a distance from the first contact point equal to about 80 percent of the distance between the first and the second contact point.

The center surface Sc comprises a plurality of openings defining an open area ScOA, the first side surface S1 comprises a plurality of openings defining an open area S1OA, and the second side surface S2 comprises a plurality of openings defining an open area S2OA. A ratio of the open area of the center surface to the open area of the first side surface ScOA/S1OA ranges from about 1.1 to about 30. A ratio of the open area of the center surface to the open area of the second side surface ScOA/S2OA ranges from about 1.1 to about 30. In at least one example embodiment, the ratio of the open area of the center surface to the first side surface or to the second side surface, ScOA/S1OA, or ScOA/S2OA range from about 2 to about 28, from about 2 to about 15, or from about 15 to about 28.

The open area of the center surface ScOA may range from about 40 percent to about 90 percent of the total area of the center surface. In at least one example embodiment, the open area in the center surface ranges from about 50 percent to about 80 percent, or from about 50 to about 70 percent.

A heater assembly may have a constant width along the length of the longitudinal axis with respect to the filament arrangement. A heater assembly may have a varying width along the length of the longitudinal axis. In these cases, for the purpose of calculating the open areas, the heater assembly is considered to be the rectangular area between two lines parallel to the longitudinal axis passing through points of the filament arrangement which are the most distant to the longitudinal axis. By this, the absence of filament arrangement in narrower parts of the heater assembly is counted as open area.

As used herein, whenever the term “about” is used in connection with a particular value throughout this application this is to be understood such that the value following the term “about” does not have to be exactly the particular value due to technical considerations. However, the term “about” used in connection with a particular value is always to be understood to include and also to explicitly disclose the particular value following the term “about”

The open area in each of the two side surfaces S1OA, S2OA is larger than zero and may be larger than about 3 percent and smaller than about 40 percent of each of the total areas of the two side surfaces. In at least one example embodiment, the open area in each of the side surfaces are larger than about 5 percent and smaller than about 35 percent, or smaller than about 20 percent. In at least one example embodiment, the open area in each of the two side surfaces ranges from about 5 percent to about 15 percent.

Most of the heating may happen in a central surface of the heater assembly between the two contact points. Little heating may happen in the side surfaces.

This variability in sizes of a heating region and side or contact regions allow to vary, in particular enlarge, a size of a heater assembly, in particular a filament arrangement of the heater assembly, however, without varying too much, in particular enlarging a heating region. This may be required or desired in order to not impose excessive demands to a power system of an aerosol-generating device.

The open area of a center surface is provided and may be required for a liquid to pass into the center surface of the heater assembly, be heated and evaporated by the heated filament arrangement.

The open area of the center surface is formed by a plurality of openings. The plurality of openings has a size and distribution chosen (e.g., optimized) for a fluid to penetrate into the openings and allow a direct and efficient heating of the fluid.

It has been found that an open area in the form of a plurality of openings in side surfaces may be beneficial to the performance of a heater assembly. The open area of each side surface is smaller than the open area of the center surface. However, the open areas of the side surfaces may also have a minimum value of, for example, about 3 percent, and a value of smaller than about 40 percent of the total area of the side surface.

Providing an open area ratio between the open area of the center surface and the open area of the side surface in the above defined ranges has been found to optimize the performance of a heater assembly in view of resistive heating and contacting a filament arrangement in the heater assembly.

Small or little open area in side surfaces, which side surfaces are used as contact portions of the filament arrangement in the heater, may positively influence an electrical contact of these side surfaces compared to, for example, meshes having low densities, for example, like meshes for center portions of a filament arrangement.

In addition, a plurality of openings in side surfaces may limit leakage of liquid out of a heater assembly. Typically, liquid is supplied from a liquid storage reservoir, for example a tank system or cartridge to the heater assembly. The liquid penetrates into the plurality of openings in the center surface where the liquid may be heated and vaporized.

Liquid tends, for example via capillary forces, to pass between a heater substrate and side portions of a filament arrangement radially outwardly of the heater. This effect may be substantial when using foils as contact portions as in prior art filament arrangements.

By providing a plurality of openings in the side surfaces, the liquid will enter into the openings and thus be kept in the side surfaces.

In at least one example embodiment, leakage may be substantially prevented and/or reduced.

Having a specific ratio of open area in center surface to side surfaces and in particular a limited open area in the two side surfaces has the further benefit of limiting dissipation of heat from the center surface to the side surfaces. By this, heat may be kept in the center of the heater assembly where evaporation takes place. Overall power consumption of a heater or a respective aerosol-generating device may be limited. In addition, any possibly present overmoulding material in side surfaces of a heater assembly is less affected by heat.

The heater assembly may further comprise a first transition surface being an area of the heater assembly extending between two lines lying perpendicular to the longitudinal axis and crossing the longitudinal axis at two points arranged on the longitudinal axis, one of the two points being situated at a distance from the first contact point equal to about 20 percent and the other one of the two points being situated at a distance from the first contact point equal to about 40 percent of the distance between the first and the second contact point. The heater may yet further comprise a second transition surface being an area of the heater assembly extending between two lines lying substantially perpendicular to the longitudinal axis and crossing the longitudinal axis at two points arranged on the longitudinal axis, one of the two points being situated at a distance from the first contact point equal to about 60 percent and the other one of the two points being situated at a distance from the first contact point equal to about 80 percent of the distance between the first and the second contact point. The first transition surface comprises a plurality of openings defining an open area T1OA, and the second transition surface comprises a plurality of openings defining an open area T2OA.

A ratio of the percentage of the total area of the first transition surface comprising the open area of the first transition surface to the percentage of the total area of the first side surface comprising the open area of the first side surface T1OA/S1OA may range from about 1 to about 30, and a ratio of the percentage of the total area of the second transition surface comprising the open area of the second transition surface to the percentage of the total area of the second side surface comprising the open area of the second side surface T2OA/S2OA may range from about 1 to about 30.

A ratio of the open area of the first transition surface to the open area of the first side surface T1OA/S1OA may range from about 1 to about 30, and a ratio of the open area of the second transition surface to the open area of the second side surface T2OA/S2OA may range from about 1 to about 30. In at least one example embodiment, the ratio of the open area of the first transition surface to the first surface or of the second transition surface to the second surface, T1OA/S1OA or T2OA/S2OA ranges from about 2 to about 28, from about 2 to about 15, or from about 15 to about 28.

A transition surface may be arranged between each of the two side surfaces and the center surface. Each transition surface may comprise an open area, for example a gradient, ranging from an open area of a side surface to an open area of the center surface. By the provision of a transition surface, for example by the provision of a gradient in open area, for example realized by a gradient in a mesh density of a mesh filament, a smooth transition of power distribution over the mesh or of the electrical resistance and respective resistive heating in the heater assembly may be achieved.

A transition surface may comprise a small open area, which amount of open area of the transition surface is closer to the open area of a side surface than of the center surface. Thus, in a mesh arrangement, a transition surface may comprise high mesh densities close to the mesh densities of the side surface. In such transition surfaces little heating occurs and heating is concentrated to the center surface.

To enlarge a heating region, the transition surfaces may comprise a large open area, similar or identical to the open area of the center surface.

The first and second transition surface may each extend over about 20 percent of the size of the filament arrangement between two contact points of the heater assembly.

In the heater assembly according to the invention, a center resistance Rc is the electrical resistance of the center surface along the longitudinal axis, a first resistance R1 is an electrical resistance of the first side surface along the longitudinal axis, and a second resistance R2 is an electrical resistance of the second side surface along the longitudinal axis. A ratio of the center resistance to the first resistance Rc/R1 may range from about 2 to about 400, and a ratio of the center resistance to the second resistance Rc/R2 may range from about 2 to about 400.

In at least one example embodiment, the ratio of the center resistance to the first resistance Rc/R1 ranges from about 2 to about 300, or from about 40 to about 200.

In at least one example embodiment, the ratio of the center resistance to the second resistance Rc/R2 ranges from about 2 to about 300, or from about 40 to about 200. The heater assembly comprises a total resistance Rt corresponding to the electrical resistance between the first contact point and the second contact point.

In at least one example embodiment, a ratio of the center resistance to the total resistance Rc/Rt corresponds to at least about 0.3, at least about 0.4, at least about 0.5, at least about 0.6, or at least about 0.7.

In at least one example embodiment, a ratio of the first resistance to the total resistance R1/Rt ranges from about 0.005 to about 0.125, above about 0.01, from about 0.01 to about 0.1, or from about 0.05 to about 0.1.

In at least one example embodiment, a ratio of the second resistance to the total resistance R2/Rt ranges from about 0.005 to about 0.125, above about 0.01, from about 0.01 to about 0.1, or from about 0.05 to about 0.1.

In at least one example embodiment, the center resistance Rc corresponds to at least about 50 percent of a total electrical resistance of the heater assembly between the first and second contact points. In at least one example embodiment, the first and second resistance each correspond to a maximum of about 13 percent of the total electrical resistance and to a minimum of about 0.5 percent of the total electrical resistance Rt.

The center resistance may correspond up to about 99 percent of the total resistance Rt. In at least one example embodiment, the center resistance corresponds to about 80 percent to about 98 percent, or to about 90 percent to about 95 percent of the total resistance Rt. Such high electrical resistance in one selected portion of the filament arrangement allows targeted heating of the filaments in this heating region and efficient evaporation of an aerosol-forming fluid to be evaporated.

The regions between the first and second contact point comprising the relatively low first and second resistance R1, R2 define electrical contact regions of the heater assembly. The contact regions are designed to not, or not substantially, transform current flowing through the contact regions of the filament arrangement into heat. The center region between the first and second contact point comprising the relatively high center resistance defines a heating region of the heater assembly.

The ratio of electrical resistance between center resistance and first and second resistance in the ranges defined above, in particular, a low electrical resistance close to the first and second contact points corresponding to a maximum of about 13 percent each of the total electrical resistance and at the same time to a minimum of about 0.5 percent of the total electrical resistance has been found to be beneficial to the performance of a heater assembly.

The low electrical resistance close to the contact points is much smaller than the electrical resistance of the heating region. The electrical resistance close to the contact points may also have a defined minimum.

A low electrical resistance close to the contact points may positively influence an electrical contact of the heater assembly compared to, for example, heater assemblies comprising filament arrangements comprising meshes having low mesh densities, for example, like meshes for heating regions of a filament arrangement. In addition, the low electrical resistance provides good transport of a heating current to the more central heating region, where heating is desired. On the other hand, having a specific ratio of center resistance to first and second resistance, in particular a minimum electrical resistance in contact regions has the benefit of limiting dissipation of heat from the heating region to the contact regions. By this, heat may be kept in a center portion or center surface of a heater assembly where evaporation takes place. Overall power consumption of a heater or a respective aerosol-generating device may be limited. In addition, any possibly present overmoulding material in contact regions, typically a polymer material, is less affected by heat.

The heater assembly may have a total resistance Rt ranging from about 0.5 Ohm to about 4 Ohm, from about 0.8 Ohm to about 3 Ohm, or about 2.5 Ohm.

In at least one example embodiment, the center resistance Rc of the center surface is higher than about 0.5 Ohm, higher than about 1 Ohm, or about 2 Ohm.

In at least one example embodiment, the first resistance R1 of the first side surface is lower than about 100 mOhm, or lower than about 50 mOhm. In at least one example embodiment, the first resistance ranges from about 5 mOhm to about 25 mOhm. In at least one example embodiment, the first resistance is higher than about 3 mOhm, or higher than about 5 mOhm.

In at least one example embodiment, the second resistance R2 of the second side surface is lower than about 100 mOhm, or lower than about 50 mOhm. In at least one example embodiment, the resistance ranges from about 5 mOhm to about 25 mOhm. In at least one example embodiment, the second resistance is higher than about 3 mOhm, or higher than about 5 mOhm.

In some example embodiments of the electrically conductive flat filament arrangements, the center portion of the filament arrangement may be identical to a center surface of a heater assembly. The side portions of the filament arrangement may be identical to the side surfaces of the heater assembly. However, depending on the positions of contact points on the filament arrangement a distance between contact points is smaller than an overall longitudinal extension or length of a filament arrangement.

The distance between the contact points may be equal to a total length of the filament arrangement. Typically, the distance between two contact points is shorter than the total length of the filament arrangement. In at least one example embodiment, the specification of the remaining portions of the filament arrangement longitudinally extending beyond the contact points is equal or similar to the specifications of the side surfaces and as described herein, in particular relating to resistance and open area.

An open area of side portions of the filament arrangement is each smaller than the open area of the center portion. However, the open areas of the side portions also have a minimum value of about 3 percent and a value of smaller than about 40 percent of the total area of the side portion.

By providing a plurality of openings in the side portions, also an overmoulding of contact portions is facilitated. Overmoulding is typically used for stability purposes of contact portions, for example when using thin contact foils or loose meshes. Side portions or at least portions of side portions may be overmoulded, for example with a heat resistive polymer. Overmoulding may prevent displacement of individual filaments, or an unravelling of filament edges. With an overmoulding of side portions stability of the side portions may be enhanced. This may facilitate mounting of the filament arrangements when assembling a heater assembly. It may also facilitate keeping a form and shape of the filament arrangement. Reproducibility and reliability of heaters using a filament arrangement may thus be improved.

An overmoulding material may be any material suitable for use in a fluid permeable heater according to the invention. An overmoulding material may for example be a material that is able to tolerate high temperatures (in excess of about 300 degree Celsius), for example polyimide or thermoplastics such as for example polyetheretherketone (PEEK).

In the filament arrangement, the overmoulding material may penetrate into the openings in the side portions. The openings may form microchannels in the filament arrangement. Thus, a connection between the material of the filament arrangement and the overmoulding material may be enhanced. The low value of open area, in particular small sized openings, may additionally support that the overmoulding material is kept in the side portions and does not flow through.

With the filament arrangement, leakage may be prevented or reduced also with overmoulded side portions. Due to a surface of the overmoulded side portion not being flat, surface irregularities may serve as liquid retention.

The term 'flat' filament arrangement or heater assembly is used throughout the specification to refer to a filament arrangement or a flat heater assembly that is in the form of a substantially two dimensional topological manifold. Thus, the flat filament arrangement and flat heater assembly extend in two dimensions along a surface substantially more than in a third dimension. In at least one example embodiment, the dimensions of the flat filament arrangement in the two dimensions within the surface is at least 5 times larger than in the third dimension, normal to the surface. In at least one example embodiment, a flat filament arrangement and a flat heater assembly is a structure between two substantially parallel imaginary surfaces, wherein the distance between these two imaginary surfaces is substantially smaller than the extension within the surfaces. In at least one example embodiment, the flat filament arrangement and the flat heater assembly is planar. In at least one example embodiment, the flat filament arrangement and the flat heater assembly are curved along one or more dimensions, for example forming a dome shape or bridge shape.

A flat filament arrangement is used in a flat heating element, which can be easily handled during manufacture and provides for a robust construction.

The term 'filament' is used throughout the specification to refer to an electrical path arranged between two electrical contacts. A filament may arbitrarily branch off and diverge into several paths or filaments, respectively, or may converge from several electrical paths into one path. A filament may have a round, square, flat or any other form of cross-section. A filament may be arranged in a straight or curved manner.

The term 'filament arrangement' is used throughout the specification to refer to an arrangement of one or a plurality of filaments. The filament arrangement may be an array of filaments, for example arranged parallel to each other. In at least one example embodiment, the filaments may form a mesh. The mesh may be woven or non-woven. In at least one example embodiment, the filament arrangement has a thickness of about 0.5 micrometers to about 500 micrometers. The filament arrangement may, for example, be in the form of an array of parallel or crosswise electrically conductive filaments. The filament may be integrally formed with electrical contacts, for example formed from an electrically conductive foil, for example, stainless steel foil, that is etched to define the filaments or openings in the center portion as well as in the side portions or in the center surface and side surfaces, respectively.

The center portion of a filament arrangement is always arranged in between the two side portions of the filament arrangement. In at least one example embodiment, the center portion is arranged in the middle between the two side portions. In a filament arrangement having a longitudinal extension larger than a transverse extension such as, for example a rectangular shaped filament arrangement, the center portion also has a longitudinal or rectangular shape. The two side portions may then be arranged adjacent two opposite sides of the center portion and separated from each other by the center portion. In at least one example embodiment, in a more circular-shaped filament arrangement, the two side portions may be separated from each other by a centrally arranged center portion and gaps extending from the centrally arranged center portion to a circumference of the circular-shaped filament arrangement.

A ratio of open areas or a value of an open area in the center portion of a filament arrangement may be defined and chosen according to a desired (or, alternatively predetermined) evaporation result or, for example, according to parameters of a heater assembly or of an aerosol-generating device the heater assembly is to be used with. In at least one example embodiment, the value of the open area in the center portion, or the number, sizes and arrangement of the openings of the plurality of openings in the center portion may be chosen according to a liquid to be evaporated (viscosity, evaporation temperature, amount of evaporated substance etc.).

A ratio of open areas or a value of an open area in the two side portions of a filament arrangement may be selected according to a heating regime through the filament arrangement or according to the way of contacting the filament arrangement to a heater substrate or contacting the heater assembly. The value of an open area in the two side portions may also be selected, for example, according to an overmoulding material used (flow speed, temperature during overmoulding etc.).

The plurality of openings in the side portions may be arranged homogenously and regularly over each of the two side portions.

The plurality of openings in the side portions may be arranged irregularly over each of the side portions. In at least one example embodiment, more or larger openings may be provided in edge regions and smaller or fewer openings may be provided in a central region of the side portion.

Amount and distribution of openings in the two side portions may be identical or symmetric with respect to the center portion. However, amount and distribution of openings in the two side portions may be different in the two side portions. Depending on an arrangement of the filament arrangement in view of a voltage applied (the side portions being connected to ground or to voltage), there may be slightly different local heating. Different amount of openings or, for example, different wire densities in the side portions may be used to even out differences in heating and thus equilibrate temperature variation over a filament arrangement. Consistent heating over an entire heating region of the filament arrangement may thus be supported.

A ratio of open areas or a value of an open area in the center surface of a heater assembly may be defined and chosen according to a desired evaporation result or, for example, according to parameters of a heater assembly or of an aerosol-generating device the heater assembly is to be used with. In at least one example embodiment, the value of the open area in the center surface, or the number, sizes and arrangement of the openings of the plurality of openings in the center surface may be chosen according to a liquid to be evaporated (viscosity, evaporation temperature, amount of evaporated substance etc.).

A ratio of open areas or a value of an open area in the two side surfaces of a heater assembly may be selected according to a heating regime through the filament arrangement or according to the way of contacting the filament arrangement to a heater substrate or contacting the heater assembly. The value of an open area in the two side surfaces may also be selected, for example, according to an overmoulding material used (flow speed, temperature during overmoulding etc.).

The plurality of openings in the side surfaces may be arranged homogenously and regularly over each of the two side surfaces.

The plurality of openings in the side surfaces may be arranged irregularly over each of the side surfaces. For example, more or larger openings may be provided in edge regions and smaller or fewer openings may be provided in a central region of the side surfaces.

Amount and distribution of openings in the two side surfaces may be identical or symmetric with respect to the center surface. However, amount and distribution of openings in the two side surfaces may be different in the two side surfaces. Different amount of openings or, for example, different wire densities in the side surfaces may be used to even out differences in heating in the center surface and thus equilibrate temperature variation over a total heater surface. Consistent heating over at least a central surface of the filament arrangement may thus be supported.

In the flat filament arrangement, a transition portion may be arranged between each of the two side portions and the center portion. Each transition portion comprises a plurality of openings defining an open area, for example a gradient, ranging from an open area of a side portion to an open area of the center portion. The distribution of the open area across the transition portion may vary between the side portion and the center portion. By the provision of a transition portion, for example by the provision of a gradient in open area, for example realized by a gradient in a mesh density of a mesh filament, a smooth transition of power distribution over the mesh or of the electrical resistance and respective heating may be achieved.

The transition portions may correspond in size, open areas and physical characteristics to the transition surfaces of a heater assembly.

If a direction extending from side portion to side portion of a filament arrangement is defined as longitudinal direction of the filament arrangement, and a transition portion is each arranged between the two side portions and the center portion, an extension of a transition portion is about 20 percent of a total longitudinal extension of the filament arrangement along the longitudinal direction.

The flat filament arrangement and the heater assembly may also comprise variations in the open area, such as for example number or size of openings, in one or all of the center portion or center surface, the side portions or side surfaces, and the transition portions or transition surfaces relative to the longitudinal axis or the longitudinal direction of the heater assembly or filament arrangement, respectively.

The filament arrangement may, for example, comprise a central longitudinal region extending from one of the two side portions over the central portion to the other one of the two side portions. The heater assembly may, for example, comprise a central longitudinal region extending from one of the two side surfaces over the transition surface, the central surface, the second transition surface to the other one of the two side portions. Therein, the percentage of the total area of the center portion inside the central longitudinal region comprising open area may be less than the percentage of the total area of the center portion outside of the central longitudinal region comprising open area. Therein, an open area in the central longitudinal region may be smaller than an open area outside of the central longitudinal region. For example, more or larger openings may be arranged in edge regions along the filament arrangement than in the central longitudinal region. In at least one example embodiment, a mesh density may be higher in the central longitudinal region than in lateral longitudinal regions along the filament arrangement. By this, a power distribution may be concentrated onto a central region of the central portion or central surface. Such a specific power distribution may, for example, be realized by a flat filament arrangement wherein in a longitudinal direction of the filament arrangement more filaments are arranged in the central longitudinal region than outside the central longitudinal region.

The flat filament arrangement may, for example, be a perforated sheet. The center portion of the perforated sheet may comprise a plurality of heater filaments separated or distanced from each other by a plurality of openings. The side portions of the perforated sheet each comprise a plurality of openings.

The openings may, for example, be manufactured by chemical etching or laser treatment.

The flat filament arrangement may, for example, be a mesh arrangement, wherein a mesh of the center portion and meshes of the first and second side portion each comprise a mesh density. The mesh density in the center portion is lower than the mesh density in each of the first and second side portions. Interstices between filaments of the meshes define the open area of the center portion and the open areas of each of the two side portions.

Mesh arrangements may be manufactured by weaving applying different weaving modes to manufacture the different portions of the mesh. By this, a single strip or a continuous band of mesh may be manufactured having different density meshes in the side portion and the center portion or in a center surface and two side surfaces. A continuously produced band of mesh may be cut to appropriately sized strips of mesh.

The filament arrangement may be manufactured at low cost, in a reliable and repeatable manner. The filament arrangement may be manufactured in one manufacturing step, not requiring assembly of individual filament arrangement parts.

In a mesh arrangement, a mesh density gradient may be located between the first portion and the center portion and between the center portion and the second side portion. These mesh gradients represent transition portions between center portion and side portions.

The mesh may be a woven mesh. The mesh of the center portion and center surface may comprise a weft aperture having a same size than a warp aperture of the mesh of the center portion or center surface. By this a mesh having regular square-shaped openings in the center portion and center surface may be manufactured.

The meshes of the two side portions and side surfaces may comprise a weft aperture larger than zero and no warp aperture. By this, very small, regularly arranged openings in the meshes of the side portions and side surfaces may be manufactured.

In at least one example embodiment, in weaving direction of the filament arrangement a same number of (warp) filaments are arranged next to each other along an entire length of the filament arrangement. In at least one example embodiment, continuing warp filaments extend at least from a first side surface to the second side surface, and may extend along the entire arrangement from one side portion over the center portion to the second side portion. By this method, mesh arrangements may be manufactured, wherein a warp aperture in the two side portions is equal to the warp aperture of the center portion or a warp aperture in the two side surfaces is equal to the warp aperture of the center surface.

In at least one example embodiment, the filament arrangement is a mesh arrangement.

For the filaments of the filament arrangement any electrically conductive material suitable for manufacturing a filament arrangement and for being heated may be used.

Materials for the filament arrangement are metals, including metal alloys, and carbon fibers. Carbon fibers may be added to metals or other carrier material to vary the resistance of the filaments.

Filament diameters may range from about 8 micrometers to about 50 micrometers, from about 10 micrometers to about 30 micrometers, from about 12 micrometers to about 20 micrometers, or be about 16 micrometer.

Side portions made of mesh may be compressed. By this, electrical contact between individual filaments of the mesh and thus of the side portions of the filament arrangement may be improved.

Sizes of openings in the center portion or center surface may, for example, have a length and width or diameter ranging from about 25 micrometers to about 75 micrometers. In at least one example embodiment, a length and width or diameter may range from about 60 to about 80 micrometers.

Sizes of openings in the side portions or side surfaces may, for example have length and width ranging from about 0.5 micrometer to about 75 micrometers. In at least one example embodiment, sizes of openings in side portions and side surfaces have, for example, a width up to about 75 micrometer when a length decreases versus about 0.5 micrometer. In at least one example embodiment, sizes of openings in side portions and side surfaces have diameters ranging from about 5 micrometers to about 50 micrometers or corresponding opening areas.

The center portion of the flat filament arrangement may have a size in a range of from about 5 $mm^2$ to about 35 $mm^2$ or from about 10 $mm^2$ to about 30 $mm^2$. In at least one example embodiment, the size may be about 25 $mm^2$. In at least one example embodiment, a center portion has a rectangular or substantially square form, and dimensions of about 5×5 $mm^2$. Heat dissipation may be kept low in portions having about a same length and width.

The center surface of the heater assembly may have a size in a range of from about 5 $mm^2$ to about 35 $mm^2$, from about 10 $mm^2$ to about 30 $mm^2$, or about 25 $mm^2$. In at least one example embodiment, a center surface has a rectangular or substantially square form having dimensions of about 5×5 mm$^2$. Heat dissipation may be kept low in surfaces having about a same length and width.

Throughout this application, whenever a value is mentioned, this is to be understood such that the value is explicitly disclosed. However, a value is also to be understood as not having to be exactly the particular value due to technical considerations.

A side portion of a filament arrangement may have a size, for example in a range of from about 3 mm$^2$ to about 15 mm$^2$, from about 5 mm$^2$ to about 10 mm$^2$, about 5 mm$^2$, or about 10 mm$^2$.

A side surface of a heater assembly may have a size in a range from about 3 mm$^2$ to about 15 mm$^2$, from about 5 mm$^2$ to about 10 mm$^2$, about 5 mm$^{2\prime}$ or about 10 mm$^2$.

In at least one example embodiment, side portions and side surfaces have the form of strips, for example a rectangular strip of about 5×(1−2) mm$^2$.

The sizes of contact portions or side portions and side surfaces, respectively, may be adapted to provide good contact with connectors used to connect the heater assembly to a power supply, for example a contact with pogo pins.

A number of openings of the plurality of openings in the center portion may, for example, be in a range from about 5 to about 100 openings per mm$^2$, from about 15 to about 70 openings per mm$^2$, or about 40 openings per mm$^2$.

A number of openings of the plurality of openings in the center surface may, for example, be in a range from about 5 to about 100 openings per mm$^2$, from about 15 to about 70 openings per mm$^2$, or about 40 openings per mm$^2$.

A number of openings of the plurality of openings in a side portion may range from about 20 to about 400 openings per mm$^2$, from about 50 to about 350 openings per mm$^2$, or from about 300 to about 350 openings per mm$^2$.

A number of openings of the plurality of openings in a side surface may, for example, be in a range from about 20 to about 400 openings per mm$^2$, about 50 to about 350 openings per mm$^2$, or about 300 to about 350 openings per mm$^2$.

A filament arrangement may be pretreated. Pretreatment may be a chemical or physical pretreatment, for example, changing the surface characteristic of the filament surface. In at least one example embodiment, a filament surface may be treated to enhance wettability of the filament, in a center portion or a center surface only. Increased wettability has been found particularly favorable for liquids typically used in electronic vaporization devices, so called e-liquids. E-liquids typically comprise an aerosol-former such as glycerol or propylene glycol. The liquids may additionally comprise flavourants or nicotine.

The aerosol-forming liquids evaporated by a heated filament may comprise at least one aerosol former and a liquid additive.

The aerosol-forming liquid may comprise water.

The liquid additive may be any one or a combination of a liquid flavour or liquid stimulating substance. Liquid flavour may for example comprise tobacco flavour, tobacco extract, fruit flavour or coffee flavour. The liquid additive may, for example, be a sweet liquid such as for example vanilla, caramel and cocoa, a herbal liquid, a spicy liquid, or a stimulating liquid containing, for example, caffeine, taurine, nicotine or other stimulating agents known for use in the food industry.

The flat filament arrangement may have a total electrical resistance from about 0.5 Ohm to about 4 Ohm, from about 0.8 Ohm to about 3 Ohm, or about 2.5 Ohm.

In at least one example embodiment, the electrical resistance of the center portion is higher than about 0.5 Ohm, higher than 1 Ohm, or about 2 Ohm.

In at least one example embodiment, the electrical resistance of each of the first and second side portions is lower than about 100 mOhm, or lower than about 50 mOhm. In at least one example embodiment, the resistance ranges from about 5 mOhm to about 25 mOhm. In at least one example embodiment the electrical resistance of each of the first and second side portions is higher than about 3 mOhm, or higher than about 5 mOhm.

Due to the open structure over an entire filament arrangement, resistance of the filament arrangement is different to, for example, prior art mesh filaments, where a homogenous mesh with a same mesh density over the entire filament arrangement is mounted to a heater assembly or where a filament arrangement is comprised of a mesh with two side metal plates as contacts. Due to the defined open area in the side portions, a resistance over the filament arrangement may be chosen (e.g., optimized) in view of contacting and heating of the filament arrangement as well as in view of assembly and use of a heater assembly comprising the filament arrangement.

The filament arrangement may be characterized by its resistance. The resistance in contact regions is higher than when using metal plates as contacts but may be the same or higher in a heating region, depending on, for example, a mesh density used for the central heating portion.

In at least one example embodiment, the fluid permeable heater assembly for aerosol-generating systems comprises a substrate comprising an opening through the substrate. The electrically conductive flat filament arrangement according to the invention and as described herein extends over the opening in the substrate. The heater assembly further comprises fastener attaching the flat filament arrangement to the substrate.

The fastener may be electrically conductive and may serve as electrical contact for providing heating current through the filament arrangement.

The fastener may be chemical or mechanical fastener. The filament arrangement may, for example be attached to the substrate by bonding or gluing.

In at least one example embodiment, the fastener is a mechanical fastener such as clamps, screws or form-locking fastener. Clamps and flat heater assemblies using clamps to clamp a filament arrangement to a heater substrate have been described in detail in the international patent publication WO2015/117701, the entire content of which is incorporated herein by reference thereto.

The fastener may be one or a combination of the aforementioned fastener.

In at least one example embodiment, the heater assembly is a flat heater assembly. In at least one example embodiment, the heater assembly is a resistively heatable fluid permeable flat heater assembly.

At least one example embodiment relates to an electrically operated aerosol-generating system. The system comprises an aerosol-generating device and a cartridge comprising a liquid aerosol-forming substrate. The system further comprises a fluid permeable heater assembly as described herein or a fluid permeable heater assembly comprising a flat filament arrangement as described herein for heating liquid aerosol-forming substrate.

The cartridge comprises a housing having an opening, with the heater assembly extending across the opening of the housing of the cartridge. The aerosol-generating device comprises a main body defining a cavity for receiving the cartridge, an electrical power source, and electrical contacts for connecting the electrical power source to the heater assembly for heating the filament arrangement.

In at least one example embodiment, the cartridge comprises a liquid comprising at least an aerosol-former and a liquid additive.

In FIG. 1 a mesh arrangement 1 for a resistively heatable flat fluid permeable heater is shown. The mesh arrangement has a rectangular shape having a length 101 (Lf). The mesh arrangement comprises a first side portion 2, a center portion 3, and a second side portion 4. The first and second side portions 2, 4 are arranged on opposite sides of the center portion 3. The center portion is designed to be the main heating region of the mesh arrangement. In FIG. 1 the three portions of the mesh filament have a rectangular shape and the two side portions 2, 4 have a same size.

The meshes defining the first and the second side portions 2, 4 have a higher density than the mesh defining the central portion 3. In at least one example embodiment, the densities of the meshes of the side portions are identical. The meshes of the side portions have an open area formed by the sum of the interstices between the filaments of the meshes of less than 20 percent of the total area of each of the first and second side portion. Thus, in the first and second side portion 2,4 an open area is each about maximal 1 $mm^2$, with a total size of each of the first and second side portion of about 5 $mm^2$.

The side or contact portions may each be contacted, for example by a pogo pin, in one spot as indicated by contact points 28, 48. Over the contact points 28, 48 a voltage is applied. The current flowing between the side portions 2, 4 causes resistive heating of the mesh filament in the center portion 3 according to its high center resistance.

Figure 1A:
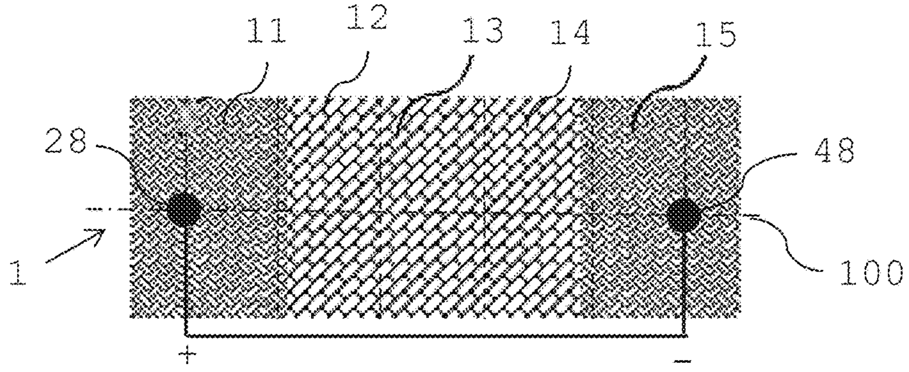
FIG. 1*a* is another schematic illustration of the mesh arrangement of FIG. 1 according to at least one example embodiment.

In FIG. 1*a* the same mesh arrangement 1 as in FIG. 1 is shown. When arranged in a heater assembly and contacted in contact points 28, 48, areas of the filament arrangement define heater surfaces each extending over 20 percent of the distance between the first contact point 28 and the second contact point 48.

A longitudinal axis 100 is defined between the first and second contact point 28, 48, which longitudinal axis corresponds to a central longitudinal axis of the filament arrangement 1. Along the longitudinal axis 100 the resistance of the heater surface is measured (see further below).

A first surface 11 extends from the first contact point 28 over about 20 percent of the distance between first and second contact point 28, 48 along the longitudinal axis into the direction of the second contact point.

A first transition surface 12 extends from about 20 percent to about 40 percent of the distance between first and second contact point 28, 48 along the longitudinal axis.

A center surface 13 extends from about 40 percent to about 60 percent of the distance between first and second contact point 28, 48 along the longitudinal axis.

A second transition surface 14 extends from about 60 percent to about 80 percent of the distance between first and second contact point 28, 48 along the longitudinal axis.

A second side surface 15 extends from about 80 percent to about 100 percent of the distance between first and second contact point 28, 48 along the longitudinal axis counted from the first contact point into the direction of the second contact point.

The center surface 13 comprises a low mesh density over its entire surface.

The first and second side surfaces 11, 15 comprise a high mesh density over its entire surface.

The first and second transition surfaces 12, 14 comprise parts with a high mesh density and parts with a low mesh density.

Figure 2:
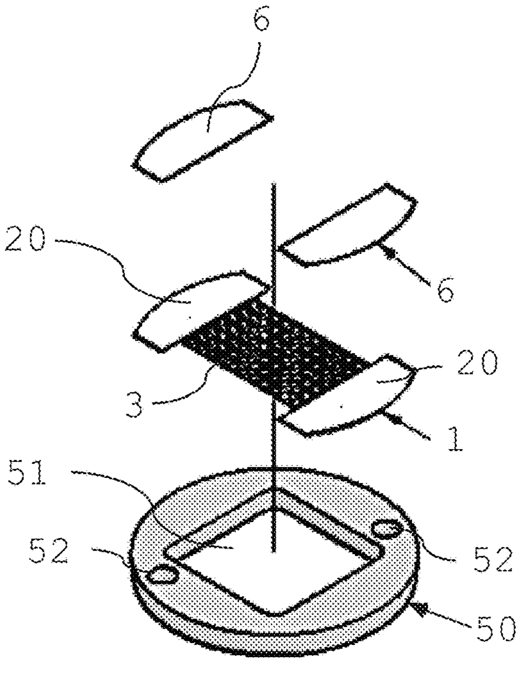
FIG. 2 is an exploded view of a heater assembly with mesh arrangement according to at least one example embodiment.
Figure 3:
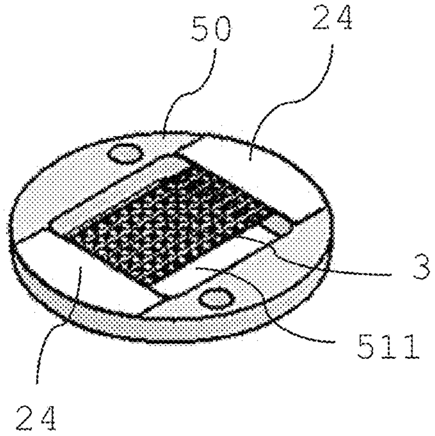
FIG. 3 shows the assembled mesh heater assembly of FIG. 2 according to at least one example embodiment.

FIG. 2 and FIG. 3 schematically show an example of a set-up of a flat, fluid-permeable heater assembly with a mesh arrangement. In the exploded view of the heater in FIG. 2 an electrically insulating substrate 50, a heater element and filament arrangement in the form of a mesh arrangement 1 and two metal sheets 6 are shown. The metal sheets may, for example, be sheets of tin, to alter electrical contact of connectors, for example contact pins, with the side portions 20 of the mesh arrangement 1.

The substrate 50 has the form of a generally circular disc. The substrate 50 comprises a centrally arranged opening 51. The substrate comprises two bore holes 52 arranged diagonally opposite each other in the substrate. The bore holes 52 may serve for positioning and mounting the heater assembly for example in an aerosol-generating device.

The mesh arrangement 1 comprises a central portion 3 and in the embodiment shown in FIGS. 2 and 3 two PEEK overmoulded side portions 20. The mesh arrangement is arranged over the square-formed centrally arranged opening 51 and over the substrate 50. The entire central portion 3 of the mesh arrangement comes to lie over the opening 51. The two side portions 20, in particular those portions of the side portions overmoulded with PEEK and tin-plated (covered with the metal sheets 6) come to lie on the substrate 50.

The width of the mesh of the central portion 3 is smaller than the width of the opening 51 such that on both lateral sides of the central portion 3 an open portion 511 of the opening 51 is formed. The open portions are not covered by mesh. The tin-plated dense mesh of the side portions forms a more plane contact area 24 than the mesh itself. The contact area 24 is arranged parallel to the top surface of the substrate 50 of the heater assembly. The contact areas 24 are for contacting the heater assembly by an electrical connector from for example a battery.

FIG. 3 shows the heater assembly of FIG. 2 in an assembled state. The mesh arrangement 1 may be attached to the substrate 50 by mechanical means or for example by adhesive.

Figure 4:
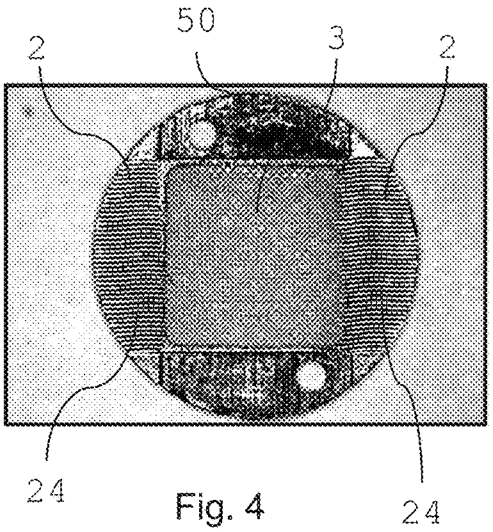
FIG. 4 shows a heater substrate with mesh arrangement according to at least one example embodiment.

FIG. 4 shows a heater substrate 50 with a mesh arrangement 1 attached thereto. The mesh arrangement is a rectangular strip of mesh with a high density mesh in contact areas 24 of the heater assembly and a low density mesh in between defining the heating region of the heater assembly.

Figure 5:
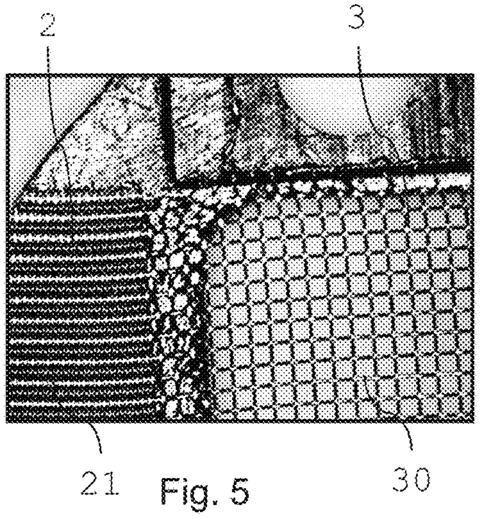
FIG. 5 is an enlarged view of FIG. 4 according to at least one example embodiment.

This may better be seen in FIG. 5, which is an enlarged view of a detail of FIG. 4. The low density mesh of the center portion of the mesh arrangement has rectangular interstices 30 in a micrometer range, for example 70 micrometer. With a wire diameter of the filaments of 16 micrometer, the open area of the center portion covers about 75 percent of the total area of the center portion.

The high density mesh of the side portions 2 of the mesh arrangement has smaller interstices 21 of about 0.1 micrometer×5 micrometer. With a filament diameter of 16 micrometer, the open area of the side portions covers about 3 percent of the total area of each of the side portions.

The mesh arrangement has been produced in one piece by different weaving modes.

The amount of filaments in a weaving direction is substantially identical over the entire filament arrangement. The weaving direction corresponds to the warp direction of the filament arrangement, which warp direction corresponds to the main current flow direction in the mesh arrangement. However, the weaving density of the filaments in weft direction (perpendicular to the warp direction) is enhanced in the side portions 2. A distance between filaments in the weft direction may be reduced to zero in the side portions 2, 4.

No transition portion between side portion 2 and center portion 3 is present in the mesh of FIGS. 4 and 5. Depending on the production mode, a transition portion may comprise a density gradient in mesh density. In at least one example embodiment, such density gradient smoothly changes from the low density of the mesh of the center portion to the higher density of the mesh of the side portion and vice versa.

Figure 6:
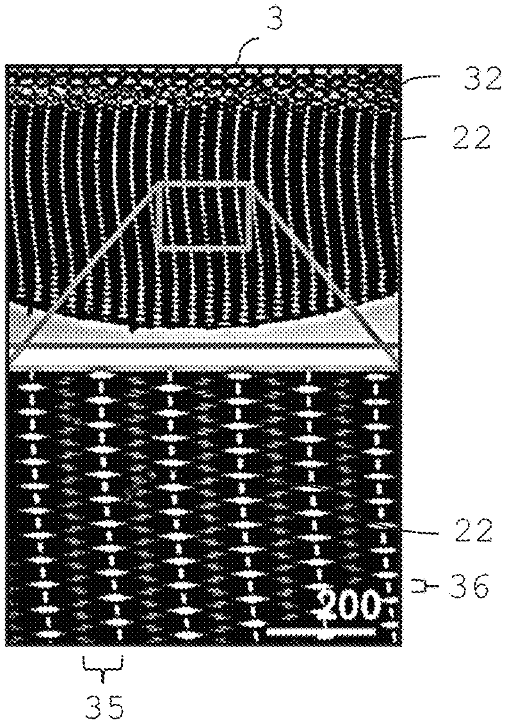
FIG. 6 shows enlarged views of transition and contact portions of a mesh arrangement according to at least one example embodiment.

In FIG. 6 a small transition portion 32 between the center portion 3 and a compressed side portion 22 is shown.

The higher density mesh in the side portions 22 has been compressed to improve electrical contact between the individual filaments of the mesh. A filament to filament distance between warp filaments 35 is about 25 micrometers to about 75 micrometers, or, as shown in FIG. 6 about 70 micrometers. The filament to filament distance of weft filaments 36 is zero. The open area in the side portions is generated by the manufacturing of the filament arrangement through weaving.

Figure 7:
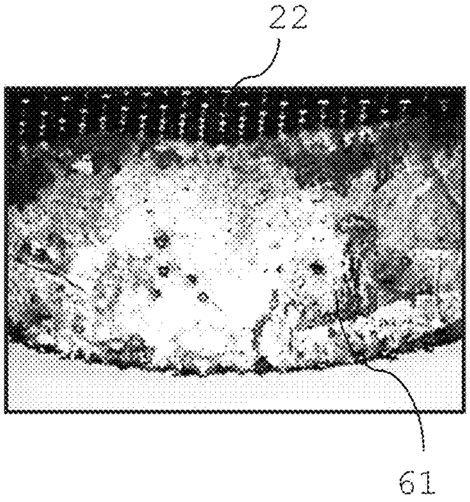
FIG. 7 shows a tin-plated contact portion of a mesh heater according to at least one example embodiment.

To improve electrical contact of the side portion 22, an outermost part of the compressed side portion 22 is tin-plated 61 as may be seen in FIG. 7.

Figure 8:
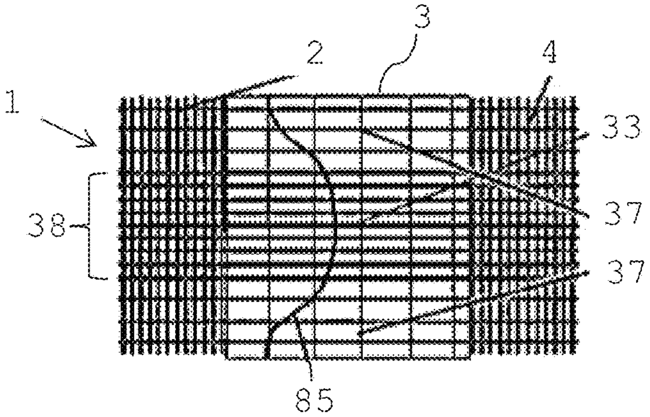
FIG. 8 is a schematic illustration of another embodiment of a mesh arrangement according to at least one example embodiment.

FIG. 8 shows a mesh arrangement 1 having a first side portion 2, an intermediate central portion 3 and an opposite second side portion 4. The mesh density in the two side portions 2, 4 is higher than the mesh density in the center portion 3. The mesh arrangement 1 comprises a longitudinal central portion 38 arranged along a longitudinal central axis of the mesh arrangement 1. The mesh density in this longitudinal central portion 38 is higher than outside in lateral side regions 37 of the mesh arrangement. The longitudinal central portion 38 has a width of about 50% to 60% of the total width of the mesh arrangement 1.

The higher mesh density in a central region 33 of the central portion leads to a high power density in this region and concentrates the main heating zone to this central region 33 of the center portion 3. Due to the different mesh densities in the different regions of the mesh arrangement, the highest power density is in the middle or central region 33 of the center portion 3. The lower density areas in the lateral regions 37 in the central portion 3 have comparably high resistance. The power density curve over the width of the central portion 3 is shown with line 85.

The side portions 2, 4 form high density mesh contact pads with comparably low resistance. The electrical contacts are in a center of the side portions 2, 4, where an electrical resistance is lowest in the side portions.

The example embodiments shown in the figures typically have symmetric side portions with a same size and a same mesh density or density distribution. Such example embodiments simplify a manufacturing and symmetric arrangement of a heater assembly. However, asymmetric mesh arrangement portions and mesh gradients may easily be provided to achieve a desired power distribution regime in the mesh filament.

Figure 9:
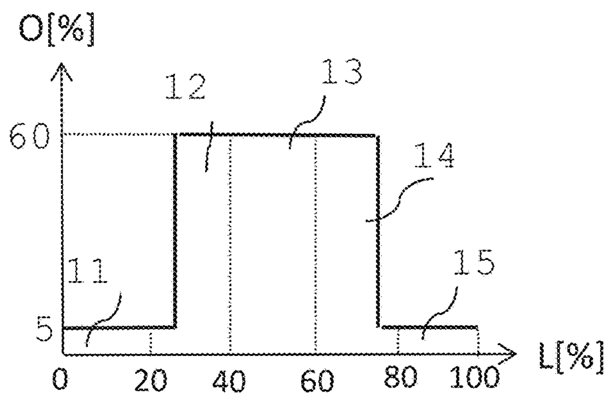
FIG. 9 is a schematic illustration of a mesh density of a heater assembly between two contact points on a filament arrangement, for example the filament arrangement of FIG. 1 according to at least one example embodiment.

In FIG. 9 an open area distribution for a heater assembly, for example comprising, the mesh arrangement of FIG. 1*a*, is shown. The vertical axis (O[%]) indicates the open area in the different surfaces of the filament arrangement. The horizontal axis (L[%]) indicates the position on the longitudinal axis 100 from the first contact point to the second contact point.

In a first surface 11 the open area S1OA is low, in FIG. 9 indicated as about 5 percent. In the center surface 13 the open area ScOA is high, in FIG. 9 indicated as about 60 percent. In the second surface 15 the open area S2OA is low again, in FIG. 9 indicated as about 5 percent as in the first surface 11.

In the first transition surface 12, the open area varies over the length of the transition surface 12. At first the open area of the transition surface T1OA is identical to the open area of the first surface S1OA. Then the open area of the first transition surface T1OA is as high as the open area of the center surface ScOA.

The second transition surface 14 arranged between center surface 13 and second surface 15 is symmetric to the first transition surface 12 with respect to the center surface 13. In the second transition surface 14, the open area T2OA also varies over the length of the transition surface 14. At first the open area of the second transition surface T2OA is identical to the open area of the center surface ScOA. Then the open area of the second transition surface is as high as the open area of the second side surface S2OA.

The filament arrangement is defined as having two surfaces 11,15, two transition surfaces 12,14 and a center surface 13 each extending over 20 percent along the longitudinal axis 100 of the filament arrangement.

Figure 9A:
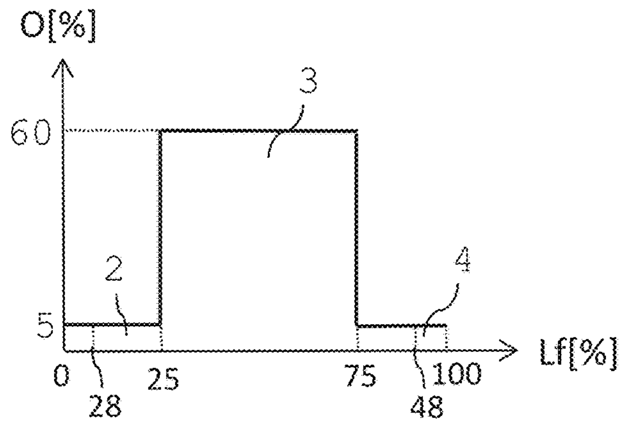
FIG. 9*a* is a schematic illustration of a mesh density of a filament arrangement, for example of FIG. 1 according to at least one example embodiment.

In FIG. 9*a* an open area distribution of a filament arrangement, for example the mesh arrangement of FIG. 1, is shown. The vertical axis indicates the open area in the different portions of the filament arrangement. The horizontal axis (Lf[%]) indicates the position on the longitudinal axis along the length Lf of the filament arrangement.

In a first side portion 2 the open area P1OA is low, in FIG. 9 indicated as 5 percent. In the center portion 3 the open area PcOA is high, in FIG. 9 indicated as 60 percent. In the second side portion 4 the open area P2OA is low again, in FIG. 9 indicated as 5 percent as in the first side portion 2.

The filament arrangement is defined as having two side portions 2, 4 and a center portion 3. The side portions each extend over about 25 percent of the size of the filament arrangement and the center portion extends to about 50 percent of the size of the filament arrangement.

Figure 10:
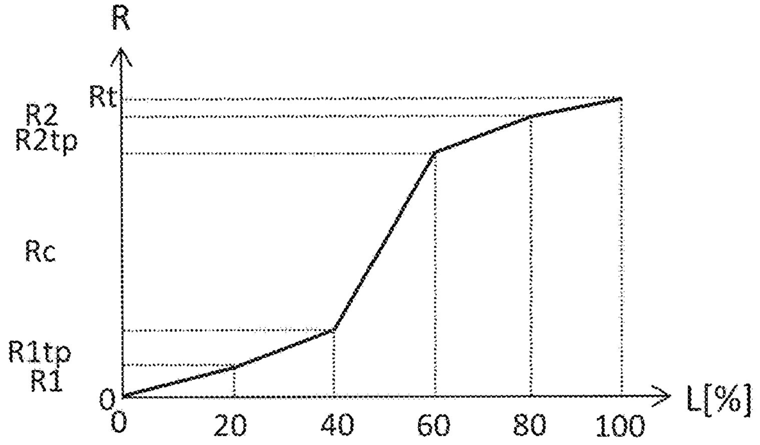
FIG. 10 is a schematic illustration of resistance distribution over a heater assembly according to at least one example embodiment.

In FIG. 10 a schematic illustration of an example embodiment of a resistance distribution along the longitudinal axis 100 of a heater assembly between a first contact point at position 0% and a second contact point at position 100% is shown. The vertical axis indicates the resistance (R) of the heater assembly up to a total resistance Rt of the heater assembly. The horizontal axis (L[%]) indicates the position on the longitudinal axis from the first contact point to the second contact point.

In the example of FIG. 10, the heater assembly comprises a first resistance R1 which is present over about 20 percent along the longitudinal axis starting at the first contact point at 0 into the direction of the second contact point. A first transition resistance R1*tp* is present from about 20 percent to about 40 percent along the longitudinal axis. A center resistance Rc is present from about 40 percent to about 60 percent along the longitudinal axis and after the first contact point. A second transition resistance R2*tp* is present from a point at about 60 percent to about 80 percent along the longitudinal axis after the first contact point. A second resistance is present from about 80 percent to about 100 percent, that is, over the last 20 percent of the heater assembly along the longitudinal axis between the first and second contact point.

The heater assembly is contacted in the first and the second contact points and a current is allowed to flow through the filament arrangement of the heater assembly.

The first resistance R1 may be up to a maximum of about 13 percent of the total resistance Rt and as low as about 0.5 percent of the total resistance Rt.

The first and second transition resistances R1*tp*, R2*tp* are each not higher than the center resistance in order to prevent extensive heating in a transition surface of a heater assembly. The first and second transition resistance R1*tp*, R2*tp* have a value in between the first resistance R1 and the center resistance Rc or the center resistance Rc and the second resistance R2, respectively. The center resistance Rc is about 50 percent of the total resistance Rt of the heater assembly. In at least one example embodiment, the center resistance Rc is more than about 50 percent of the total resistance Rt. The second resistance may be up to a maximum of about 13 percent of the total resistance Rt and as low as about 0.5 percent of the total resistance Rt.

The first and second resistance R1, R2, the first and second transition resistance R1*tp*, R2*tp* and the center resistance Rc add up to the total resistance Rt of the heater assembly.

Side portions of filament arrangements may be smaller or larger, have more and smaller or less and larger openings, be smaller and have higher mesh density or be larger and have lower mesh density, all in order to achieve a same or a specific resistance regime in the surfaces of the heater assembly. Such variations allow much flexibility in the application of the filament arrangement and the heater assembly. In at least one example embodiment, it enables to adapt the filament arrangement and heater assembly to various liquids to be aerosolized, for example more or less viscous fluids.

The filament arrangement may be modified for differently sized heaters or to aerosol-generating devices having more or less power available for heating a heater comprising the filament arrangement.

We claim:

1. An aerosol-generating system comprising:
- a fluid permeable heater assembly including,
  - an electrically conductive flat filament arrangement including,
    - a flat filament including,
      - a center portion,
      - two side portions, the two side portions on opposite sides of the center portion, the center portion defining a heating region and the two side portions defining electrical contact regions, and
      - a transition portion between each of the two side portions and the center portion, each transition portion including,
        - a plurality of openings defining an open area of the transition portion, and distribution of the open area of the transition portion across the transition portion varies between the side portion and the center portion.

2. The aerosol-generating system of claim 1, wherein the center portion and the two side portions each include a plurality of openings, the plurality of openings of the center area defining an open area of the center portion and the plurality of openings of each side portion defining an open area of each of the two side portions, a percentage of a total area of the center portion including the open area of the center portion being greater than a percentage of a total area of one of the two side portions including the open area of each of the two side portions.

3. The aerosol-generating system of claim 2, wherein a ratio of the percentage of the total area of the center portion to the percentage of the total area of one of the two side portions ranges from 1.1 to 30.

4. The aerosol-generating system of claim 2, wherein the open area of the center portion ranges from 40 percent to 90 percent of the total area of the center portion.

5. The aerosol-generating system of claim 2, wherein the open area of each of the two side portions is larger than 3 percent and smaller than 40 percent of the total area one of the two side portions.

6. The aerosol-generating system of claim 2, further comprising:
- a central longitudinal region extending from one of the two side portions over the center portion to the other one of the two side portions, the percentage of the total area of the center portion inside the central longitudinal region comprising the open area of the center portion is less than the percentage of the total area of the center portion outside of the central longitudinal region comprising the open area of the center portion.

7. The aerosol-generating system of claim 1, wherein the filament arrangement is a mesh arrangement.

8. The aerosol-generating system of claim 7, wherein a mesh of the center portion and meshes of the two side portions each have a respective mesh density, the mesh density of the mesh of the center portion being lower than the mesh density of the meshes of the two side portions.

9. The aerosol-generating system of claim 8, wherein a mesh density gradient is established between the two side portions and the center portion.

10. The aerosol-generating system of claim 7, wherein the mesh arrangement is woven.

11. The aerosol-generating system of claim 10, wherein in a weaving direction of the mesh arrangement, a constant number of filaments are arranged next to each other along an entire length of the mesh arrangement.

12. The aerosol-generating system of claim 1, wherein the heater assembly further comprises:
- a first contact point; and
- a second contact point, the first contact point and the second contact point configured to electrically contact the flat filament arrangement.

* * * * *